(12) United States Patent
Mok et al.

(10) Patent No.: US 12,457,314 B2
(45) Date of Patent: Oct. 28, 2025

(54) STEREOSCOPIC IMAGE DISPLAY DEVICE

(71) Applicant: SAMSUNG DISPLAY CO., LTD., Yongin-si (KR)

(72) Inventors: Rang Kyun Mok, Yongin-si (KR); Jeong Woo Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 132 days.

(21) Appl. No.: 18/401,109

(22) Filed: Dec. 29, 2023

(65) Prior Publication Data

US 2024/0297975 A1    Sep. 5, 2024

(30) Foreign Application Priority Data

Mar. 2, 2023 (KR) .......................... 10-2023-0027908

(51) Int. Cl.
*H04N 13/305* (2018.01)
*H04N 13/32* (2018.01)
*H04N 13/398* (2018.01)

(52) U.S. Cl.
CPC ........... *H04N 13/305* (2018.05); *H04N 13/32* (2018.05); *H04N 13/398* (2018.05)

(58) Field of Classification Search
CPC ........ G02B 30/27; G02B 30/25; G02B 30/28; G02B 30/30; G02B 30/31; H04N 13/305; H04N 13/31; H04N 13/337; H04N 13/359; H04N 13/351; H04N 13/312; H04N 13/361; G02F 1/133528
See application file for complete search history.

(56) References Cited

U.S. PATENT DOCUMENTS

| 2009/0091667 | A1* | 4/2009 | Schultz | ............... H04N 13/312 349/15 |
| 2014/0029087 | A1* | 1/2014 | Yoon | ..................... G02F 1/139 156/247 |
| 2014/0168744 | A1* | 6/2014 | Li | ............................ G02F 1/29 29/829 |

FOREIGN PATENT DOCUMENTS

| CN | 102681195 A | 9/2012 |
| KR | 10-2014-0147923 | 12/2014 |
| KR | 10-2000144 | 10/2019 |

(Continued)

OTHER PUBLICATIONS

EESR issued in corresponding EP Application No. EP 24159975.2 dated Jul. 22, 2024.

*Primary Examiner* — Farhan Mahmud
(74) *Attorney, Agent, or Firm* — F. CHAU & ASSOCIATES, LLC

(57) ABSTRACT

A display device includes a display panel displaying a two-dimensional (2D) image and a three-dimensional (3D) image. A light transmission control unit passes 2D image display light displayed on the display panel in a first linearly polarized light direction and converts a polarized light direction of 3D image display light displayed on the display panel into a second linearly polarized light direction and emits the 3D image display light in the second linearly polarized light direction. An optical device passes the 2D image display light incident in the first linearly polarized light direction through the light transmission control unit while maintaining optical paths of the 2D image display light and refracting and emitting the 3D image display light of which the polarized light direction is converted into the second linearly polarized light direction through light transmission control unit.

19 Claims, 14 Drawing Sheets

(56) References Cited

FOREIGN PATENT DOCUMENTS

| KR | 10-2143373 | 8/2020 |
|---|---|---|
| WO | WO2013181910 A1 | 12/2013 |

\* cited by examiner

| | 2D MODE | 3D MODE |
|---|---|---|
| 132 | 0V | 0V |
| 142 | 0V (5V) | 25V |
| 151 | 0V | 0V |
| 155 | 0V | 5V |

STEREOSCOPIC IMAGE DISPLAY DEVICE

CROSS-REFERENCE TO RELATED APPLICATION

This application claims priority under 35 U.S.C. § 119 to Korean Patent Application No. 10-2023-0027908, filed on Mar. 2, 2023 in the Korean Intellectual Property Office, the contents of which are herein incorporated by reference in their entirety.

TECHNICAL FIELD

The present disclosure relates to a display device and, more specifically, to a stereoscopic image display device.

DISCUSSION OF THE RELATED ART

A stereoscopic image display device is a device that allows for a viewer to perceive a sense of depth by sending separate images to the user's left and right angle. While this can be achieved with the use of special 3D glasses, it may also be achieved without the use of 3D glasses by using an optical device to direct the eye-specific images to the correct eye by controlling a viewing angle of the light that is emitted from the display device.

When 3D glasses are used, the display device might be configured to send left-eye and right-eye images to the correct eyes of the viewer by changing the polarization of each eye-image and then using glasses having different polarized filters on each eye to ensure that each eye sees only its intended image. Another approach uses 3D glasses with shutters that are synchronized with the display device so as to only allow the proper eye-specific image into the prior eye at the proper time. The stereoscopic image display device using a non-glasses technique implements a stereoscopic image by forming optical device such as a parallax barrier and a lenticular lens sheet in the display device and separating optical axes of left and right parallax images. However, the stereoscopic image display device using a non-glasses technique had a problem in that parallax images adjacent to each other may be viewed in a superimposed state.

SUMMARY

According to an embodiment of the disclosure, a display device includes a display panel displaying a two-dimensional (2D) image or a three-dimensional (3D) image, a light transmission control unit passing 2D image display light displayed on the display panel in a first linearly polarized light direction and converting a polarized light direction of 3D image display light displayed on the display panel into a second linearly polarized light direction and emitting the 3D image display light in the second linearly polarized light direction, and an optical device passing the 2D image display light incident in the first linearly polarized light direction through the light transmission control unit while maintaining optical paths of the 2D image display light and refracting and emitting the 3D image display light of which the polarized light direction is converted into the second linearly polarized light direction through light transmission control unit.

The display device may further include a display driver changing a voltage difference between first and second driving voltages and supplying the first and second driving voltages to the light transmission control unit during each 2D image display period or 3D image display period so that the light transmission control unit passes the 2D image display light in the first linearly polarized light direction and converts the polarized light direction of the 3D image display light into the second linearly polarized light direction and emits the 3D image display light in the second linearly polarized light direction.

The light transmission control unit may include a plurality of light transmitting separation membranes partitioning a light emission area of the light transmission control unit, in a plan view, according to arrangement positions of anisotropic lenses included in the optical device, and may divide and emit the 3D image display light for each emission area using the plurality of light transmitting separation membranes.

The light transmission control unit may include a first base substrate disposed on a front surface of the display panel, a plurality of first polarizing electrodes disposed on the first base substrate according to an arrangement position of each anisotropic lens included in the optical device, a second base substrate facing the first base substrate and parallel to the first base substrate, a plurality of second polarizing electrodes disposed in a rear surface direction of the second base substrate so as to face the plurality of first polarizing electrodes and correspond to the plurality of first polarizing electrodes in parallel with the plurality of first polarizing electrodes, a plurality of polarization control layers interposed between the plurality of first polarizing electrodes and the plurality of second polarizing electrodes, respectively, and a plurality of light transmitting separation membranes interposed between the first base substrate and the second base substrate so that a light emission area of the light transmission control unit, in a plan view, is partitioned according to the arrangement position of each anisotropic lens.

The plurality of first polarizing electrodes may be disposed on the first base substrate in parallel with at least one anisotropic lens so as to correspond to the arrangement position of each anisotropic lens and a shape of a base side of each anisotropic lens, and each of the plurality of first polarizing electrodes may have an area and a width that are smaller than an area and a width of the base side of each of the anisotropic lenses.

The plurality of second polarizing electrodes may be disposed on a rear surface of the second base substrate so as to face the plurality of first polarizing electrodes with each of the polarization control layers interposed therebetween and may correspond to the plurality of first polarizing electrodes in parallel with the plurality of first polarizing electrodes, and the plurality of second polarizing electrodes may have the same area, width, and length as the first polarizing electrodes facing the plurality of second polarizing electrodes, respectively.

The plurality of polarization control layers may pass the 2D image display light incident in the first linearly polarized light direction in the first linearly polarized light direction and may convert the polarized light direction of the 3D image display light incident in the first linearly polarized light direction into the second linearly polarized light direction and may emit the 3D image display light in the second linearly polarized light direction, according to a voltage difference between the first polarizing electrodes and the second polarizing electrodes.

A display driver may be disposed on the display panel, the display driver may change a voltage difference between first and second driving voltages and supplying the first and second driving voltages to the first and second polarizing electrodes, respectively, in a 2D image display mode or a 3D image display mode so that the plurality of polarization control layers pass the 2D image display light in the first linearly polarized light direction and convert the polarized light direction of the 3D image display light into the second linearly polarized light direction and emit the 3D image display light in the second linearly polarized light direction.

The plurality of light transmitting separation membranes may pass the 2D image display light incident in the first linearly polarized direction during a 2D image display period and control optical paths of the 3D image display light so that the 3D image display light incident in the second linearly polarized direction is divided and emitted for each emission area during a 3D image display period, in response to first and second control signals of a display driver.

The plurality of light transmitting separation membranes may be disposed in areas between the first polarizing electrodes adjacent to each other in a plane direction among the plurality of the first polarizing electrodes and areas between the second polarizing electrodes adjacent to each other in the plane direction among the plurality of second polarizing electrodes, respectively, and may be disposed at a same length as the anisotropic lenses included in the optical device, and may overlap base sides of two anisotropic lenses adjacent to each other by a preset width.

The plurality of light transmitting separation membranes may include first light transmitting electrodes each disposed in areas between the first polarizing electrodes adjacent to each other among the plurality of the first polarizing electrodes, second light transmitting electrodes each disposed in areas between the second polarizing electrodes adjacent to each other among the plurality of second polarizing electrodes, and color-changing material layers each interposed between the first light transmitting electrodes and the second light transmitting electrodes.

The first light transmitting electrodes may be formed on the first base substrate so as to have a same length as the first polarizing electrodes along a length direction of the first polarizing electrodes, and the second light transmitting electrodes may be formed between the second polarizing electrodes adjacent to each other so as to face the first light transmitting electrodes with each of the color-changing material layers interposed therebetween and correspond to the first light transmitting electrodes in parallel with the first light transmitting electrodes, and may have a same area, width, and length as the first light transmitting electrodes.

The color-changing material layer may be kept transparent or color-changed to a black color according to a voltage difference between a first control voltage of the first light transmitting electrode and a second control voltage of the second light transmitting electrode.

A display driver may be disposed on the display panel, the display driver generating the first and second control voltages having the same voltage magnitude and supplying the first and second control voltages to the first and second light transmitting electrodes, respectively, during the 2D image display period and generating the first and second control voltages having a voltage difference greater than a preset voltage difference and supplying the first and second control voltages to the first and second light transmitting electrodes, respectively, during the 3D image display period.

The optical device may include a flat part disposed as a plane in a front surface direction of the light transmission control unit; and a stereoscopic lens layer may emit the 2D image display light incident in the first linearly polarized light direction in the front surface direction while maintaining optical paths of the 2D image display light and may refract and change light paths of the 3D image display light incident in the second linearly polarized light direction and may emit the 3D image display light in a direction in which the light paths of the 3D image display light are refracted.

The stereoscopic lens layer may include a plurality of first anisotropic lenses arranged side by side on a front surface of the flat part, and a plurality of second anisotropic lenses covering the plurality of first anisotropic lenses and formed on front surfaces of the plurality of first anisotropic lenses.

The plurality of first anisotropic lenses may be formed in a hemispherical shape in which liquid crystals are hardened in a state in which major axis directions of the liquid crystals are aligned in the second linearly polarized light direction, such that the plurality of first anisotropic lenses have characteristics of refractive index anisotropy that a refractive index of emitted light changes depending on light in the first or second linearly polarized light direction incident from a rear surface direction.

The plurality of second anisotropic lenses may have a same refractive index as a refractive index in minor axis directions of the liquid crystals, and may correspond to the plurality of first anisotropic lenses in a one-to-one manner by covering the plurality of first anisotropic lenses, respectively, or may be integrally formed to cover all of the plurality of first anisotropic lenses.

A display device includes a display panel displaying a 2D image or a 3D image, a light transmission control unit passing 2D image display light displayed on the display panel in a first linearly polarized light direction and converting a polarized light direction of 3D image display light displayed on the display panel into a second linearly polarized light direction and emitting the 3D image display light in the second linearly polarized light direction, an optical device passing image display light emitted in the first linearly polarized light direction through the light transmission control unit while maintaining optical paths of the image display light and refracting optical paths of image display light emitted in the second linearly polarized light direction through light transmission control unit and emitting the image display light of which the optical paths are refracted, and a display driver controlling an emission operation of the first or second linearly polarized light direction of the light transmission control unit according to a 2D image display mode or a 3D image display mode.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present disclosure will now be described more fully hereinafter with reference to the accompanying drawings, in which embodiments of the disclosure are shown. This disclosure may, however, be embodied in different forms and should not necessarily be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers may indicate the same components throughout the specification and the figures.

It will be understood that, although the terms "first," "second," etc. may be used herein to describe various elements, these elements should not necessarily be limited by these terms. These terms are used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, specific embodiments will be described with reference to the accompanying drawings.

Figure 1:
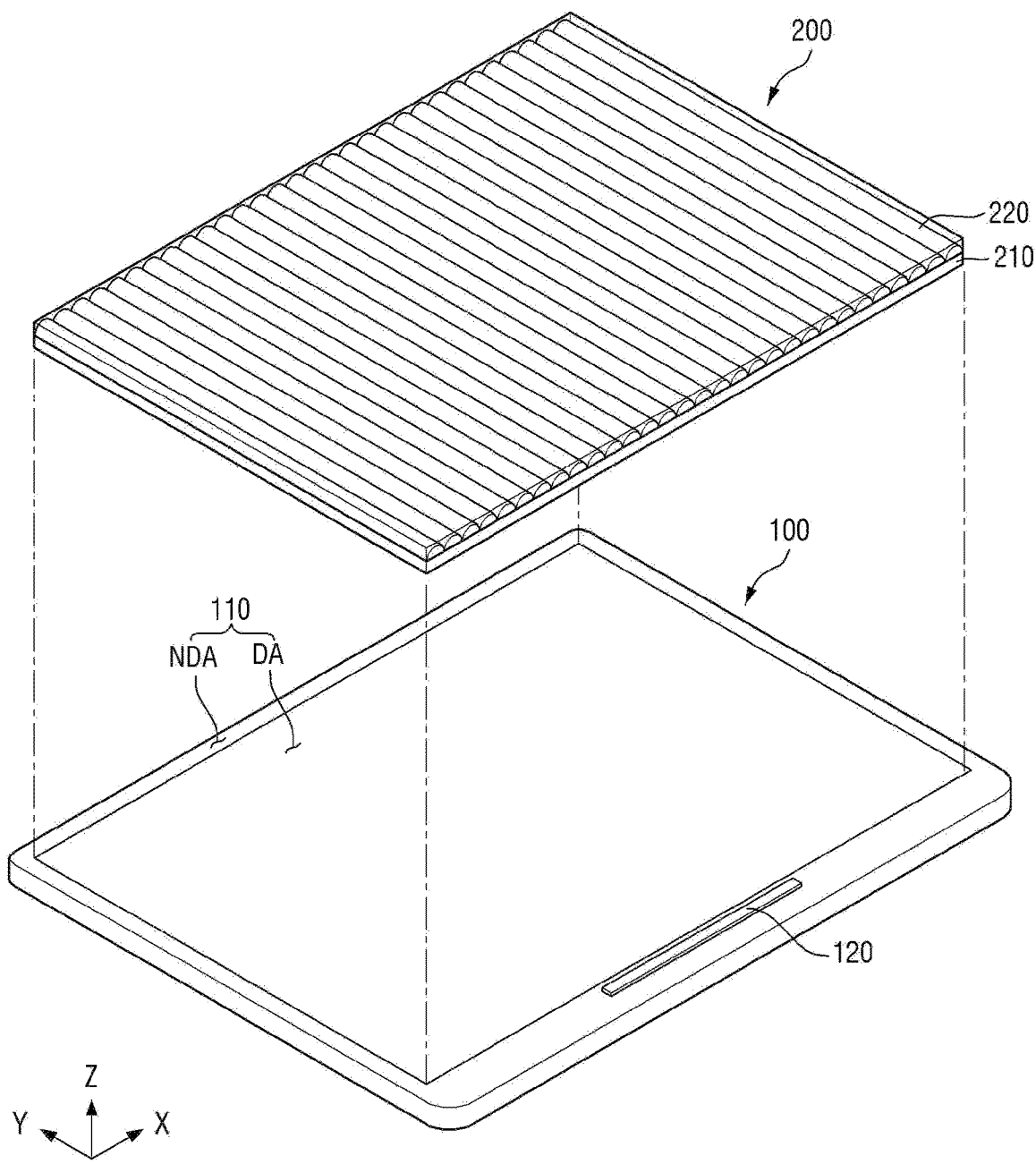
FIG. 1 is an exploded perspective view illustrating a display device according to an embodiment.
Figure 2:
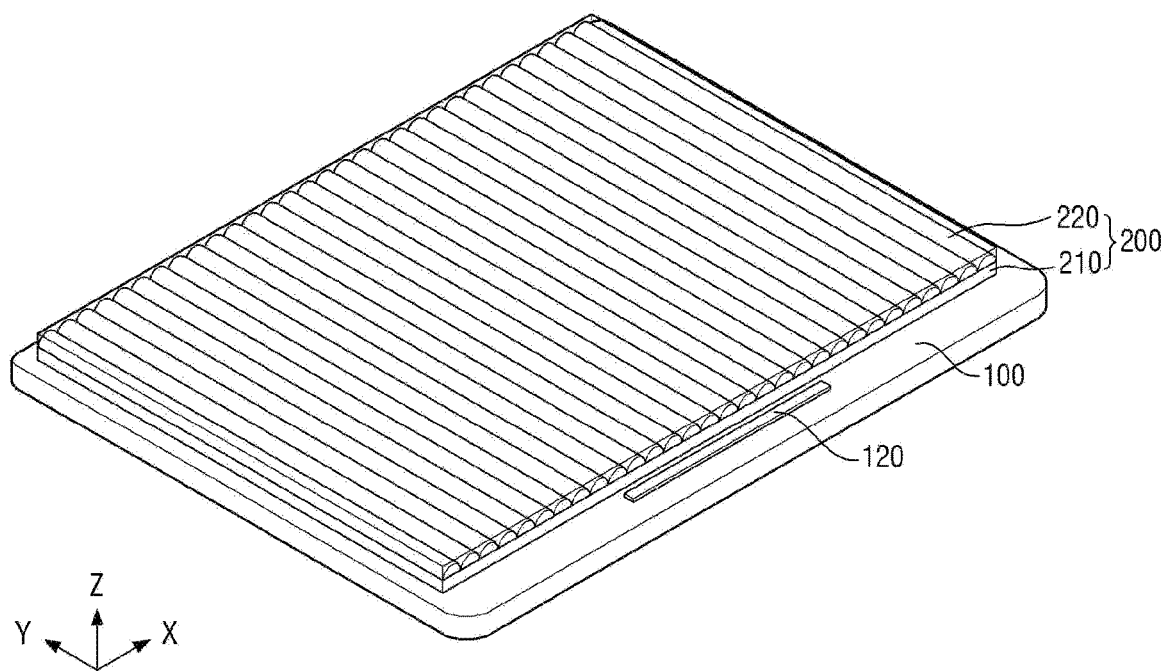
FIG. 2 is a coupled configuration view of a display panel and an optical device illustrated in FIG. 1.

FIG. 1 is an exploded perspective view illustrating a display device according to an embodiment. FIG. 2 is a coupled configuration view of a display panel and an optical device illustrated in FIG. 1.

A display device 290 may be implemented as a flat panel display device such as a liquid crystal display (LCD), a field emission display (FED), a plasma display panel (PDP), or an organic light emitting display (OLED).

The display device 290 may be a stereoscopic image display device including a display module 100 and an optical device 200, for example, a three-dimensional (3D) image display device. To display a 3D image, the stereoscopic image display device may separate and display a left-eye image and a right-eye image in a front surface direction so as to make a viewer feel a three-dimensional effect by binocular parallax. Furthermore, the stereoscopic image display device may separate and provide a plurality of viewing angle images to a front surface of the display device so that different images are viewed for each of different viewing angles.

The display device 290, according to an embodiment, may be a light field display device that allows different image information to be viewed to viewer's eyes by disposing the optical device 200 on a front surface of the display module 100. The light field display device may create a stereoscopic image by generating a light field by the display module 100 and the 3D optical device 200. As described later, light rays generated from each pixel of the display module 100 of the light field display device may form a light field directed toward a specific direction (e.g., specific viewing angle and/or specific viewpoint) by a stereoscopic lens, a pinhole, a barrier, or the like, and accordingly, stereoscopic image information corresponding to the specific direction may be provided to the viewer.

The display module 100 may include a display panel 110, a display driver 120, and a circuit board.

The display panel 110 may include a display area DA and a non-display area NDA. The display area DA may include data lines, scan lines, voltage supply lines, and a plurality of pixels connected to the corresponding data lines and scan lines. For example, the scan lines may extend in a first direction (X-axis direction) and may be spaced apart from each other in a second direction (Y-axis direction). The data lines and the voltage supply lines may extend in the second direction (Y-axis direction) and may be spaced apart from each other in the first direction (X-axis direction).

Each of the pixels may be connected to at least one scan line, data line, and voltage supply line. Each of the pixels may include thin film transistors including a driving transistor and at least one switching transistor, a light emitting element, and a capacitor. Each of the pixels may receive a data voltage of the data line when a scan signal is applied from the scan line to each of the pixels, and may emit light by supplying a driving current to the light emitting element according to a data voltage applied to a gate electrode of the driving transistor.

In the present disclosure, the pixels of the display panel 110 display a two-dimensional (2D) image in a 2D mode and display a stereoscopic image, for example, a multi-view image in a 3D mode, according to the order in which the display driver 120 supplies image data. The multi-view image includes n (where n is an integer of 2 or more) view images. Here, the n view images are images generated by capturing an image of an object with n cameras spaced apart from each other by a binocular distance of an ordinary person. The display panel 110 displays the multi-view image in units of n pixels in the 3D mode. For example, the display panel 110 may display the multi-view image in units of two pixels in the 3D mode. For example, two pixels of the display panel 110 may display the multi-view image including two view images.

The non-display area NDA may at least partially surround the display area DA at an edge of the display panel 110. The non-display area NDA may include a scan driver applying scan signals to the scan lines and pads connected to the display driver 120. For example, the display driver 120 may be disposed on one side of the non-display area NDA, and the pads may be disposed at an edge of one side of the non-display area NDA on which the display driver 120 is disposed.

The display driver 120 may output control signals and image data voltages for driving the display panel 110 in units of at least one frame or units of at least one subframe. The display driver 120 may supply image data voltages to the data lines in units of at least one subframe. The display driver 120 may supply a source voltage to the voltage supply line and supply scan control signals to the scan driver.

The display driver 120 sets viewing viewpoints for each sub-pixel and viewing viewpoint numbers according to the viewing viewpoints according to relative arrangement positions of sub-pixels for each anisotropic lens included in a stereoscopic lens layer 220 of the optical device 200. In addition, the display driver 120 aligns arrangement positions, for each horizontal line, of image data input from the outside according to the viewing viewpoints and the viewing viewpoint numbers of the sub-pixels. The display driver 120 may allow images to be displayed according to relative arrangement positions of the sub-pixels with respect to the stereoscopic lens layer 220 by generating image data voltages so as to correspond to the image data of which the arrangement positions for each horizontal line are aligned and supplying the image data voltages to the data lines.

The display driver 120 may be formed as an integrated circuit (IC) and may be disposed in the non-display area NDA of the display panel 110 in a chip on glass (COG) manner, a chip on plastic (COP) manner, or an ultrasonic bonding manner. As an example, the display driver 120 may be mounted on the circuit board and be connected to the pads of the display panel 110.

The optical device 200 may be disposed in a front surface direction of the display panel 110 or the display module 100. The optical device 200 may be attached to one surface of the display panel 110 or the display area DA through an adhesive. Such an optical device 200 may be bonded to the front surface of the display module 100 by a separate panel bonding device. As an example, the optical device 200 may be implemented as a lenticular lens sheet including the stereoscopic lens layer 220. As an example, the stereoscopic lens layer 220 may include a plurality of first anisotropic lenses (or a first anisotropic lens sheet) forming optical paths according to a liquid crystal arrangement of a liquid crystal layer and second anisotropic lenses (or a second anisotropic lens sheet) forming optical paths of light emitted through the plurality of first anisotropic lenses. As such, when the stereoscopic lens layer 220 is implemented as a lenticular lens sheet type by including the plurality of first anisotropic lenses, the stereoscopic lens layer 220 may be disposed on a flat part 210.

The flat part 210 may be directly disposed in the front surface direction of the display panel 110 or the display area DA. For example, one surface of the flat part 210 facing the display area DA and the other surface of the flat part 210 opposite to one surface of the flat part 210 may be parallel to each other. The flat part 210 may output light incident from the display area DA as it is. A direction of light passing through one surface of the flat part 210 may coincide with a direction of light passing through the other surface of the flat part 210. The flat part 210 may be formed integrally with the stereoscopic lens layer 220, but is not necessarily limited thereto.

The stereoscopic lens layer 220 may be disposed on the flat part 210 and may change an emission direction or a travel direction of emitted light incident from the display area DA on a rear surface thereof and emitted in a front surface direction thereof. For example, image display light incident from the display area DA of the display module 100 may pass through the flat part 210 and reach the rear surface of the stereoscopic lens layer 220.

The first anisotropic lenses (or the first anisotropic lens sheet) of the stereoscopic lens layer 220 may be slanted by a predetermined angle from one side of the display module 100 or the display area DA. As an example, the plurality of first anisotropic lenses may be formed as a slanted lens type slanted by a predetermined angle based on one side of each of the sub-pixels of the display area DA or a half-cylindrical lens type. Here, the predetermined angle may be designed to prevent a color band of the display device from being recognized by the viewer. As another example, the plurality of first anisotropic lenses may be implemented as Fresnel lenses. A shape or a type of the plurality of first anisotropic lenses is not necessarily limited thereto.

The stereoscopic lens layer 220 may be manufactured separately from the flat part 210 and then attached onto the flat part 210. Alternatively, the stereoscopic lens layer 220 may be formed integrally with the flat part 210. The first anisotropic lenses (or the first anisotropic lens sheet) of the stereoscopic lens layer 220 may be formed as embossed patterns on an upper surface of the flat part 210.

Figure 3:
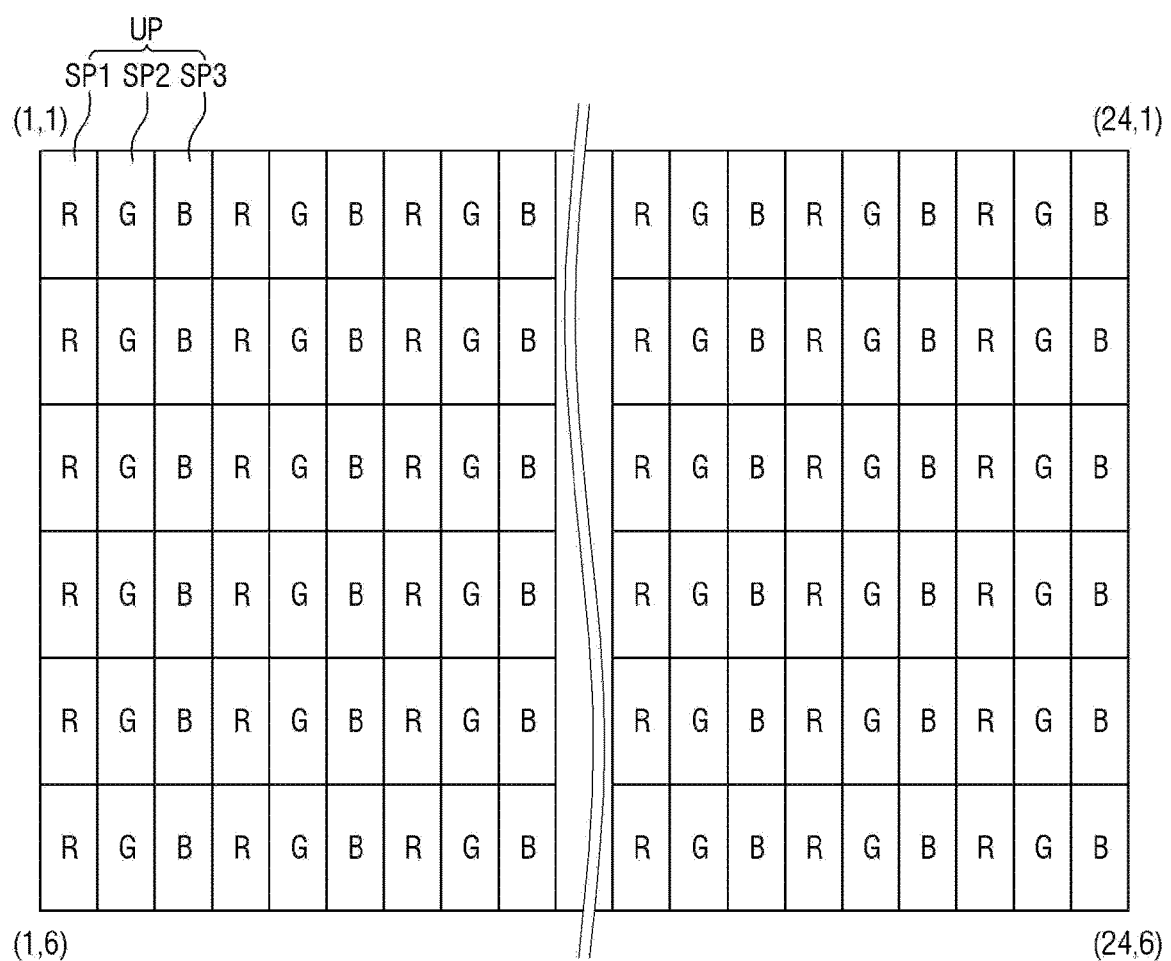
FIG. 3 is a plan view partially illustrating an arrangement structure of sub-pixels of a display area.

FIG. 3 is a plan view partially illustrating an arrangement structure of sub-pixels of a display area.

FIG. 3 illustrates an arrangement structure of sub-pixels arranged in a size of 24×6. Accordingly, an arrangement form from a sub-pixel arranged at a 1×1 arrangement position to a sub-pixel arranged at a 24×6 arrangement position has been illustrated in FIG. 3.

Referring to FIG. 3, a plurality of unit pixels UP are arranged and formed in the display area DA of the display panel 110, and each of the unit pixels UP includes a plurality of sub-pixels SP1, SP2, and SP3. The respective sub-pixels SP1, SP2, and SP3 may be arranged along a plurality of rows and a plurality of columns. For example, the plurality of sub-pixels SP1, SP2, and SP3 may be arranged and formed in a vertical or horizontal stripe structure. In this case, the display area DA may include more unit pixels UP as a resolution of the display device increases.

For example, each of the unit pixels UP may include first to third sub-pixels SP1, SP2, and SP3 displaying different colors. The first to third sub-pixels SP1, SP2, and SP3 may be provided by intersection between n data lines (where n is a positive integer) and m scan lines (where m is a positive integer). Each of the plurality of sub-pixels SP1, SP2, and SP3 may include a light emitting element and a pixel circuit. The pixel circuit may include a driving transistor, at least one switching transistor, and at least one capacitor to drive the light emitting element of each of the plurality of sub-pixels.

Each of the plurality of unit pixels UP may include one first sub-pixel SP1, one second sub-pixel SP2, and one third sub-pixel SP3. Alternatively, each of the plurality of unit pixels UP may include a total of four sub-pixels including one first sub-pixel SP1, two second sub-pixels SP2, and one third sub-pixel SP3. The number of sub-pixels included in each unit pixel UP is not necessarily limited thereto. The first sub-pixel SP1 may be a red sub-pixel, the second sub-pixel SP2 may be a green sub-pixel, and the third sub-pixel SP3 may be a blue sub-pixel. Each of the first to third sub-pixels SP1, SP2, and SP3 may receive a data signal including luminance information of red, green, or blue light from the display driver 120 and output light of a corresponding color.

Figure 4:
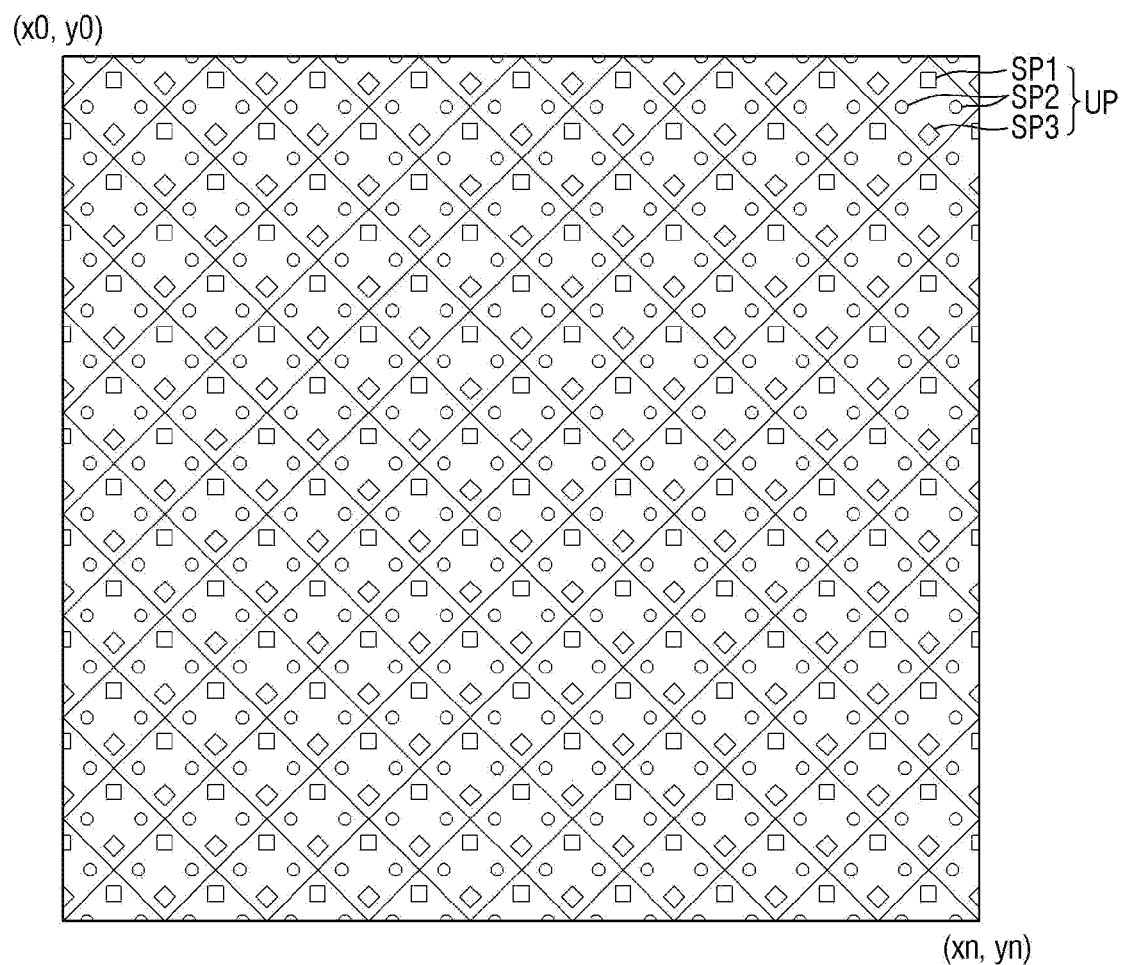
FIG. 4 is a plan view of an embodiment partially illustrating an arrangement structure of sub-pixels of a display area.

FIG. 4 is a plan view of an embodiment partially illustrating an arrangement structure of sub-pixels of a display area.

Referring to FIG. 4, a plurality of unit pixels UP and a plurality of sub-pixels SP1, SP2, and SP3 may be arranged in a PENTILE™ matrix form, where PENTILE is an arrangement of luminous areas manufactured by SAMSUNG. For example, each of the plurality of unit pixels UP may include first to third sub-pixels SP1, SP2, and SP3 arranged in a PENTILE™ matrix form. A plurality of first to third sub-pixels SP1, SP2, and SP3 may be provided by intersection between n data lines (where n is a positive integer) and m scan lines (where m is a positive integer equal to or different from n).

Each of the plurality of unit pixels UP may include one first sub-pixel SP1, two second sub-pixels SP2, and one third sub-pixel SP3, but is not necessarily limited thereto. Here, the first sub-pixel SP1 may be a red sub-pixel, the second sub-pixel SP2 may be a green sub-pixel, and the third sub-pixel SP3 may be a blue sub-pixel. A size of an opening area of each of the first to third sub-pixels SP1, SP2, and SP3 may be determined according to luminance of corresponding light. Accordingly, the size of the opening area of each of the first to third sub-pixels SP1, SP2, and SP3 may be adjusted to implement white light by mixing light emitted from each of a plurality of light emitting layers. Each of the first to third sub-pixels SP1, SP2, and SP3 may receive a data signal including luminance information of red, green, or blue light from the display driver 120 and output light of a corresponding color.

Figure 5:
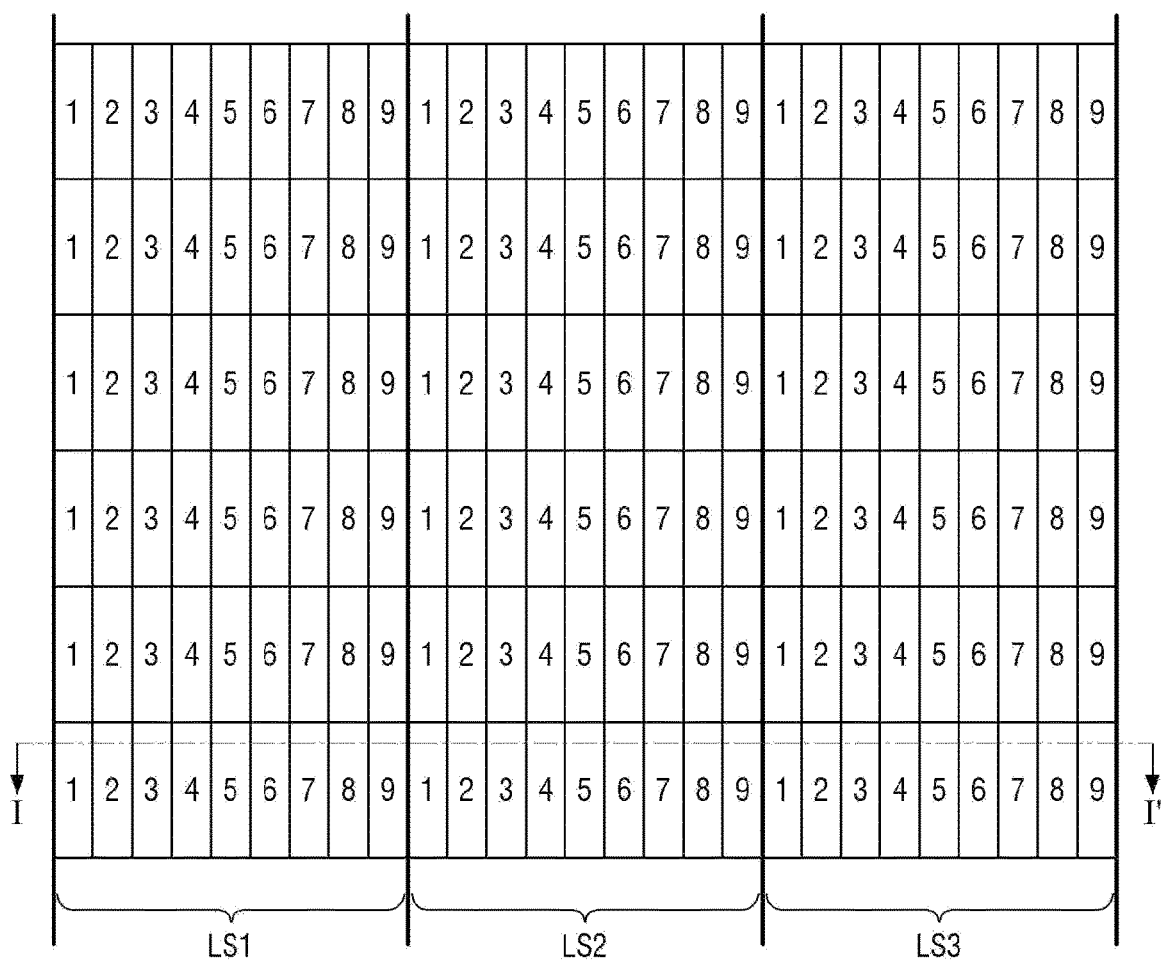
FIG. 5 is a view illustrating a method of setting viewing viewpoint information for each sub-pixel according to widths of lenses of an optical device.

FIG. 5 is a view illustrating a method of setting viewing viewpoint information for each sub-pixel according to widths of lenses of an optical device.

Referring to FIG. 5, viewing viewpoint information and viewing viewpoint numbers for each sub-pixel may be set in order according to relative arrangement positions of the sub-pixels SP1, SP2, and SP3 overlapping respective first anisotropic lenses LS1, LS2, and LS3 according to information such as a width and a slanted angle of each of the first anisotropic lenses LS1, LS2, and LS3.

As an example, viewing viewpoint information and viewpoint numbers according to the relative arrangement positions of the sub-pixels SP1, SP2, and SP3 overlapping the first anisotropic lenses LS1, LS2, and LS3, respectively, are repeatedly set in a width direction or the X-axis direction of each of the first anisotropic lenses LS1, LS2, and LS3. This may be represented as in Equation 1.

Viewing viewpoint information (or viewpoint number)=rows×pixelsize×tan(slanted angle)    [Equation 1]

Here, rows is the order in a horizontal line direction, and pixelsize is a width or a size of each sub-pixel. In addition, tan (slanted angle) is a slanted angle (tθ), but in the present embodiment, the lenses are disposed side by side in the Y-axis direction (or a vertical direction), and thus, tan (slanted angle) becomes 1.

All of viewing viewpoint information (or viewpoint numbers) of sub-pixels arranged in a first horizontal line and viewing viewpoint information of sub-pixels arranged from a second horizontal line to the last horizontal line are the same as each other in the Y-axis direction (or the vertical direction).

For example, viewing viewpoint information of the respective sub-pixels SP1, SP2, and SP3 is set according to the relative arrangement positions of the sub-pixels SP1, SP2, and SP3 with respect to the respective first anisotropic lenses LS1, LS2, and LS3, and image display viewpoints or viewing viewpoints of the display device 290 are set according to the viewing viewpoint information and the viewpoint numbers of the respective sub-pixels SP1, SP2, and SP3.

As illustrated in FIG. 5, the image displaying viewpoints or the viewing viewpoints of the display device 290 may be set to be the same as the number and viewpoint numbers of sub-pixels corresponding to or included in a width of each of the first anisotropic lenses LS1, LS2, and LS3 and disposed on a rear surface of each of the first anisotropic lenses LS1, LS2, and LS3. In particular, when the number of sub-pixels corresponding to or included in a width of a rear surface (or a base surface or a base side) of each of the first anisotropic lenses LS1, LS2, and LS3 and disposed on the rear surface of each of the first anisotropic lenses LS1, LS2, and LS3 is nine, the viewing viewpoints for detecting optical characteristics of the display device 290 may be set to nine viewing viewpoints.

Figure 6:
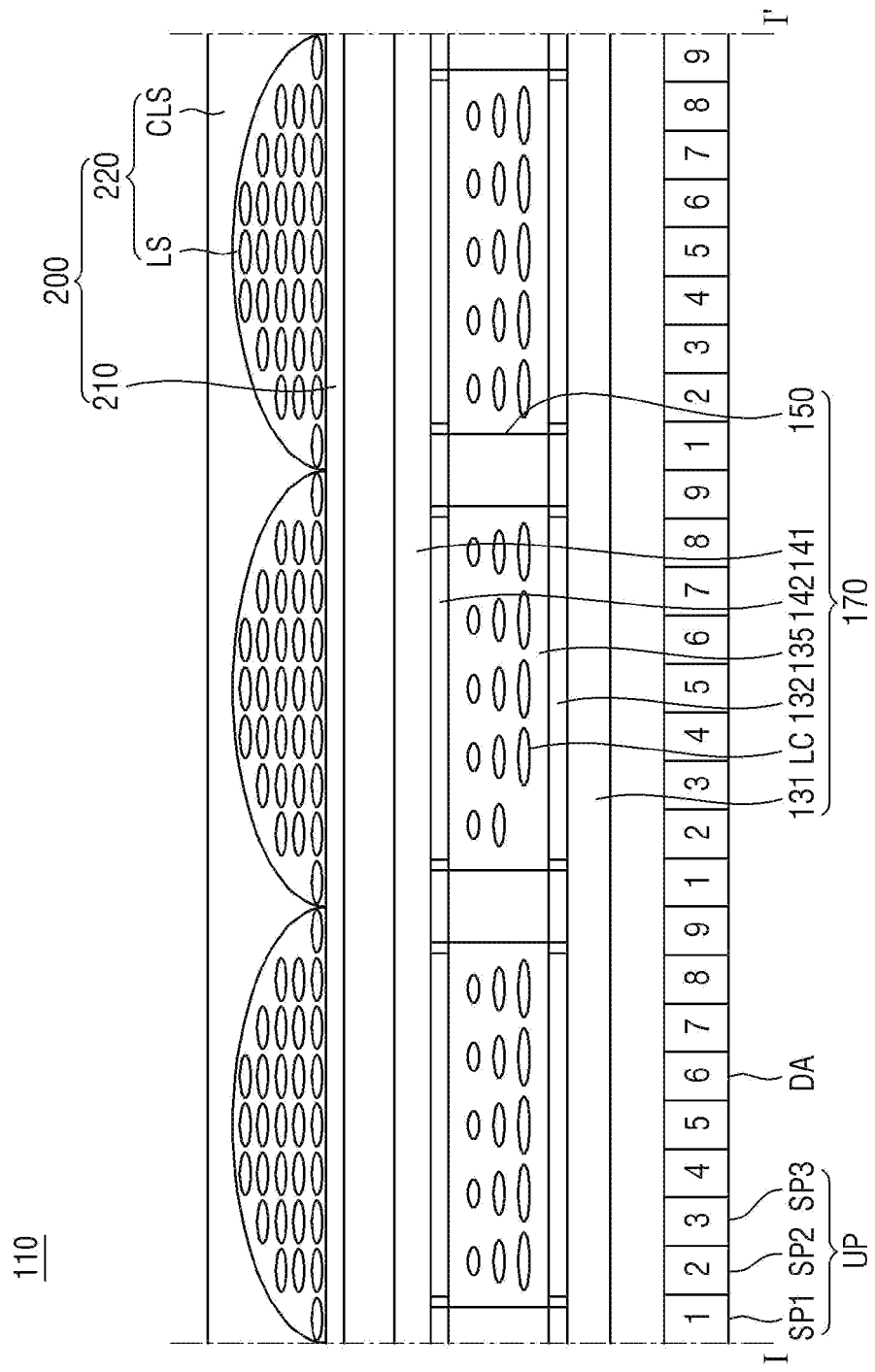
FIG. 6 is a cross-sectional view illustrating a cut surface taken along line I-I' of in FIG. 5 in detail.

FIG. 6 is a cross-sectional view illustrating a cut surface taken along line I-I' of in FIG. 5 in detail.

Referring to FIGS. 5 and 6, the display device 290 includes the display panel 110 displaying a 2D image or a 3D image, a light transmission control unit 170 changing a polarized light direction of 2D image or 3D image display light, and the optical device 200 maintaining or refracting optical paths of the image display light emitted through the light transmission control unit 170.

As described above, the first to third sub-pixels SP1, SP2, and SP3 of the display panel 110 display the 2D image in the 2D mode and display the stereoscopic image, for example, the multi-view image, in the 3D mode. For example, in the 3D mode, the first to third sub-pixels SP1, SP2, and SP3 may display the multi-view image in units of two adjacent sub-pixels. For example, the first to third sub-pixels SP1, SP2, and SP3 may display the multi-view image including two view images of the two adjacent sub-pixels. The first to third sub-pixels SP1, SP2, and SP3 of the display panel 110 may emit 2D or 3D image display light in a first linearly polarized light direction to a front surface according to an arrangement alignment or the like of polarizers on the front surface.

The light transmission control unit 170 passes the 2D image display light displayed on the display panel 110 as it is in the first linearly polarized light direction, and converts a polarized light direction of the 3D image display light displayed on the display panel 110 into a second linearly polarized light direction different from the first linearly polarized light direction and emits the 3D image display light in the second linearly polarized light direction. As an example, the first linearly polarized light direction may refer to a direction of light traveling while vibrating in a Z-axis direction, and the second linearly polarized light direction may refer to a direction of light traveling while vibrating in the X-axis direction.

The light transmission control unit 170 divides an emission area of the 3D image display light emitted in the second linearly polarized light direction, and allows the 3D image display light to be divided and emitted for each divided area. As the 3D image display light is divided and emitted for each divided area, the image display light for each of the sub-pixels adjacent to each other and each of the divided areas adjacent to each other may be emitted without overlapping with each other. Structural features of the light transmission control unit 170 will be described in more detail below.

The light transmission control unit 170 includes a first base substrate 131, a plurality of first polarizing electrodes 132, a second base substrate 141, a plurality of second polarizing electrodes 142, a plurality of polarization control layers 135, and a plurality of light transmitting separation membranes 150.

The first base substrate 131 is disposed on a front surface of the display panel 110 or the display area DA. The first base substrate 131 may include transparent glass, a transparent plastic film, or the like.

The plurality of first polarizing electrodes 132 are disposed on a front surface of the first base substrate 131 according to an arrangement position of each first anisotropic lens LS included in the optical device 200. For example, the plurality of first polarizing electrodes 132 may be disposed on the first base substrate 131 in parallel with a plurality of first anisotropic lenses LS, respectively, so as to correspond to an arrangement position of each of the plurality of first anisotropic lenses LS included in the optical device 200 and a shape of a base side of each of the plurality of first anisotropic lenses LS. For example, each of the plurality of first polarizing electrodes 132 may have an area and a width that are smaller than an area and a width of the base side of each of the plurality of first anisotropic lenses LS.

The second base substrate 141 faces the first base substrate 131 with the plurality of light transmitting separation membranes 150 and the plurality of polarization control layers 135 interposed therebetween and be parallel to the first base substrate 131. The second base substrate 141 may include transparent glass, a transparent plastic film, or the like, like the first base substrate 131.

The plurality of second polarizing electrodes 142 are disposed on a rear surface of the second base substrate 141 so as to face the plurality of first polarizing electrodes 132 with each of the polarization control layers 135 interposed therebetween and correspond to the first polarizing electrodes 132 in parallel with the first polarizing electrodes 132. The plurality of second polarizing electrodes 142 may have the same area, width, and length as the first polarizing electrodes 132 facing the plurality of second polarizing electrodes 142, respectively.

The plurality of polarization control layers 135 are interposed between the first polarizing electrodes 132 and the second polarizing electrodes 142, respectively. The plurality of polarization control layers 135 pass the 2D image display light in the first linearly polarized light direction and convert the polarized light direction of the 3D image display light into the second linearly polarized light direction and emit the 3D image display light in the second linearly polarized light direction, according to a voltage difference between the first polarizing electrodes 132 and the second polarizing electrodes 142 that face each other. To this end, the plurality of polarization control layers 135 may include a liquid crystal layer in which a plurality of liquid crystals LC are arranged. An arrangement of the liquid crystals LC in the liquid crystal layer is changed depending on a voltage difference between a first driving voltage of the first polarizing electrode 132 and a second driving voltage of the second polarizing electrode 142.

The light transmission control unit 170 emits image display light incident from the display panel 110 while maintaining a polarized light direction of the image display light or changes the polarized light direction of the image display light and emits the image display light in the changed polarized light direction by controlling the arrangement of the liquid crystals LC during a 2D image display period and the arrangement of the liquid crystals LC during a 3D image display period to be different from each other. For example, the light transmission control unit 170 passes the 2D image display light incident in the first linearly polarized light direction while maintaining a polarized light direction of the 2D image display light as the first linearly polarized light direction, and changes a polarized light direction of the 3D image display light incident in the first linearly polarized light direction into the second linearly polarized light direction and emits the 3D image display light in the second linearly polarized light direction.

The plurality of light transmitting separation membranes 150 are interposed between the first base substrate 131 and the second base substrate 141 so that a light emission area of the light transmission control unit 170 is partitioned, in a plan view, according to the arrangement position of each first anisotropic lens LS included in the optical device 200. For example, the plurality of light transmitting separation membranes 150 partition the light emission area of the light transmission control unit 170, in a plan view, according to contact positions of both side surfaces and arrangement positions of the first anisotropic lenses LS aligned in the optical device 200.

The plurality of light transmitting separation membranes 150 pass the 2D image display light emitted in the first linearly polarized light direction as it is, and allow the 3D image display light emitted in the second linearly polarized light direction to be divided and emitted for each emission area. Accordingly, the plurality of light transmitting separation membranes 150 may allow the 3D image display light of the sub-pixels adjacent to each other or the emission areas adjacent to each other to be emitted without overlapping each other.

The plurality of light transmitting separation membranes 150 may be disposed in areas between the first polarizing electrodes 132 adjacent to each other in a plane direction and areas between the second polarizing electrodes 142 adjacent to each other in the plane direction, respectively. The plurality of light transmitting separation membranes 150 are disposed at the same length as the first anisotropic lenses LS along a length direction of the first anisotropic lenses LS adjacent to each other in the plane direction, and overlap base sides of two first anisotropic lenses LS adjacent to each other by a predetermined width. A detailed description of the plurality of light transmitting separation membranes 150 will be provided later with reference to FIG. 7 and the like.

The optical device 200 emits the image display light emitted through the light transmission control unit 170 while maintaining optical paths of the image display light or changes the optical paths of the image display light and emits the image display light through the changed optical paths. To this end, the optical device 200 includes the flat part 210 and the stereoscopic lens layer 220.

The flat part 210 of the optical device 200 is disposed as a plane in a front surface direction of the light transmission control unit 170. The flat part 210 may include transparent glass, a transparent plastic film, or the like, and may be seated and adhered in the front surface direction of the light transmission control unit 170.

The stereoscopic lens layer 220 may be seated and adhered in a front surface direction of the flat part 210. The stereoscopic lens layer 220 emits the 2D image display light incident in the first linearly polarized light direction in the front surface direction while maintaining optical paths of the 2D image display light, and refracts and changes light paths of the 3D image display light incident in the second linearly polarized light direction and emits the 3D image display light in a direction in which the light paths of the 3D image display light are refracted.

The stereoscopic lens layer 220 includes the plurality of first anisotropic lenses LS arranged side by side on a front surface of the flat part 210 and a plurality of second anisotropic lenses CLS covering the plurality of first anisotropic lenses LS and formed on front surfaces of the plurality of first anisotropic lenses LS.

Each of the plurality of first anisotropic lenses LS may be formed in a hemispherical shape by aligning major axis directions of liquid crystals in the second linearly polarized light direction and then hardening the liquid crystals. Accordingly, the plurality of first anisotropic lenses LS have characteristics of refractive index anisotropy that a refractive index of the emitted light changes depending on light in the first or second linearly polarized light direction incident from a rear surface direction.

The plurality of second anisotropic lenses CLS may have the same refractive index as a refractive index in minor axis directions of the liquid crystals. The plurality of second anisotropic lenses CLS may be formed to correspond to the plurality of first anisotropic lenses LS in a one-to-one manner by covering the plurality of first anisotropic lenses LS, respectively, or may be integrally formed to cover all of the plurality of first anisotropic lenses LS.

When the image display light is incident on the plurality of first anisotropic lenses LS in the first linearly polarized light direction, the image display light incident on the plurality of first anisotropic lenses LS in the first linearly polarized light direction passes through the plurality of first anisotropic lenses LS as it is in the first linearly polarized light direction according to the refractive index in the minor axis directions of the liquid crystals included in the plurality of first anisotropic lenses LS. In this case, since the plurality of second anisotropic lenses CLS also have the refractive index in the minor axis directions of the liquid crystals, the image display light in the first linearly polarized light direction is not refracted and passes in the front surface direction at interfaces between the plurality of first anisotropic lenses LS and the plurality of second anisotropic lenses CLS.

However, when the image display light of which the polarized light direction is changed into the second linearly polarized light direction is incident on the plurality of first anisotropic lenses LS, the polarized light direction of the image display light incident on the plurality of first anisotropic lenses LS in the first linearly polarized light direction may be changed depending on a refractive index in the major axis directions of the liquid crystals included the plurality of first anisotropic lenses. Accordingly, the image display light is refracted at the interfaces between the plurality of first anisotropic lenses LS having the refractive index in the major axis directions of the liquid crystals and the plurality of second anisotropic lenses CLS having the refractive index in the minor axis directions of the liquid crystals. As such, the plurality of first anisotropic lenses LS are implemented to serve as refractive lenses only when the image display light in the second linearly polarized light direction is incident thereon.

Figure 7:
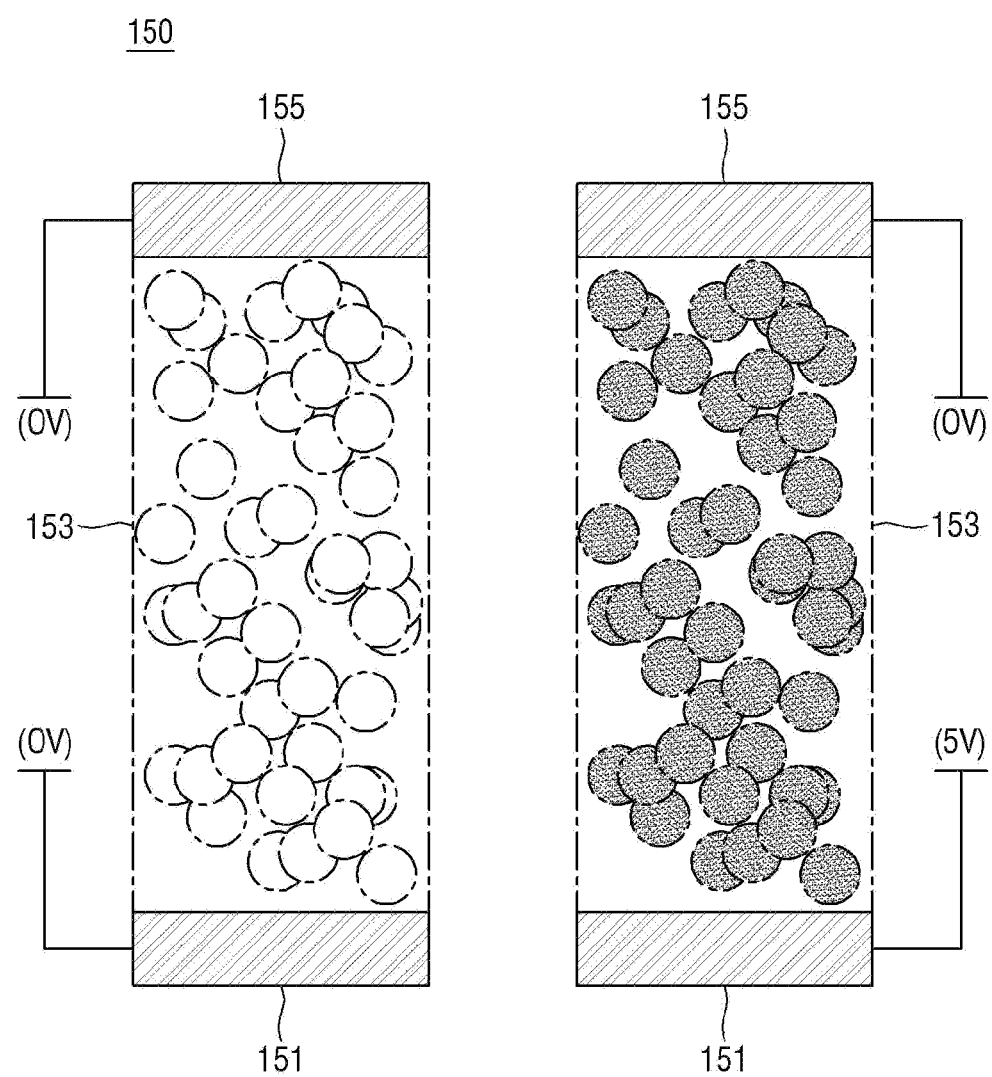
FIG. 7 is a cross-sectional view illustrating a light transmitting separation membrane of FIG. 6 in detail.

FIG. 7 is a cross-sectional view illustrating a light transmitting separation membrane of FIG. 6 in detail.

Referring to FIGS. 6 and 7, the plurality of light transmitting separation membranes 150 include first light transmitting electrodes 151 each disposed in the areas between the first polarizing electrodes 132 adjacent to each other, second light transmitting electrodes 155 each disposed in the areas between the second polarizing electrodes 142 adjacent to each other, and color-changing material layers 153 each interposed between the first light transmitting electrodes 151 and the second light transmitting electrodes 155.

The first light transmitting electrodes 151 are formed at the same length as the first polarizing electrodes 132 along a length direction of the first polarizing electrodes 132 adjacent to each other in the areas between the first polarizing electrodes 132 adjacent to each other in the plane direction, and are formed on the first base substrate 131. Accordingly, the first light transmitting electrode 151 may overlap the base sides of the two first anisotropic lenses LS disposed adjacent to and in contact with each other by a predetermined width.

The second light transmitting electrodes 155 are formed between the second polarizing electrodes 142 adjacent to each other so as to face the first light transmitting electrodes 151 with each of the color-changing material layers 153 interposed therebetween and correspond to the first light transmitting electrodes 151 in parallel with the first light transmitting electrodes 151. The second light transmitting electrodes 155 may be formed on the rear surface of the second base substrate 141 and may have the same area, width, and length as the first light transmitting electrodes 151 facing the second light transmitting electrodes 155 in parallel with the second light transmitting electrodes 155, respectively.

The color-changing material layer 153 is color-changed according to a voltage difference between a first control voltage of the first light transmitting electrode 151 and a second control voltage of the second light transmitting electrode 155 between the first light transmitting electrode 151 and the second light transmitting electrode 155.

The color-changing material layer 153 includes an electrochromic material such as tungsten that is oxidized or reduced according to an electrochemical reaction. As an example, an electrochromic material such as tungsten oxide may absorb ambient light and be color-changed to a predetermined color such as black color when a reduction reaction occurs and be changed to be transparent when an oxidation reaction occurs. As another example, an electrochromic material such as viologen (1,1'-dibenzyl-4,4'-bipyridinium bistetrafluorborate) may also absorb ambient light and be color-changed to a predetermined color such as black color when a reduction reaction occurs and be changed to be transparent when an oxidation reaction occurs. As such, the color-changing material layer 153 may further include mixed materials with other electrochromic materials that show various colors by the reduction reaction in addition to the electrochromic material such as the tungsten oxide or the viologen to increase a light shielding function of the color-changing material layer 153.

Referring to FIG. 7, when the voltage difference between the first control voltage of the first light transmitting electrode 151 and the second control voltage of the second light transmitting electrode 155 is 0 V, the electrochromic materials included in the color-change material layer 153 may be oxidized to be kept transparent. When the voltage difference between the first control voltage of the first light transmitting electrode 151 and the second control voltage of the second light transmitting electrode 155 is 3 V to 5 V or more, the electrochromic materials included in the color-change material layer 153 may be reduced to be color-changed to a predetermined color such as a black color.

Figure 8:
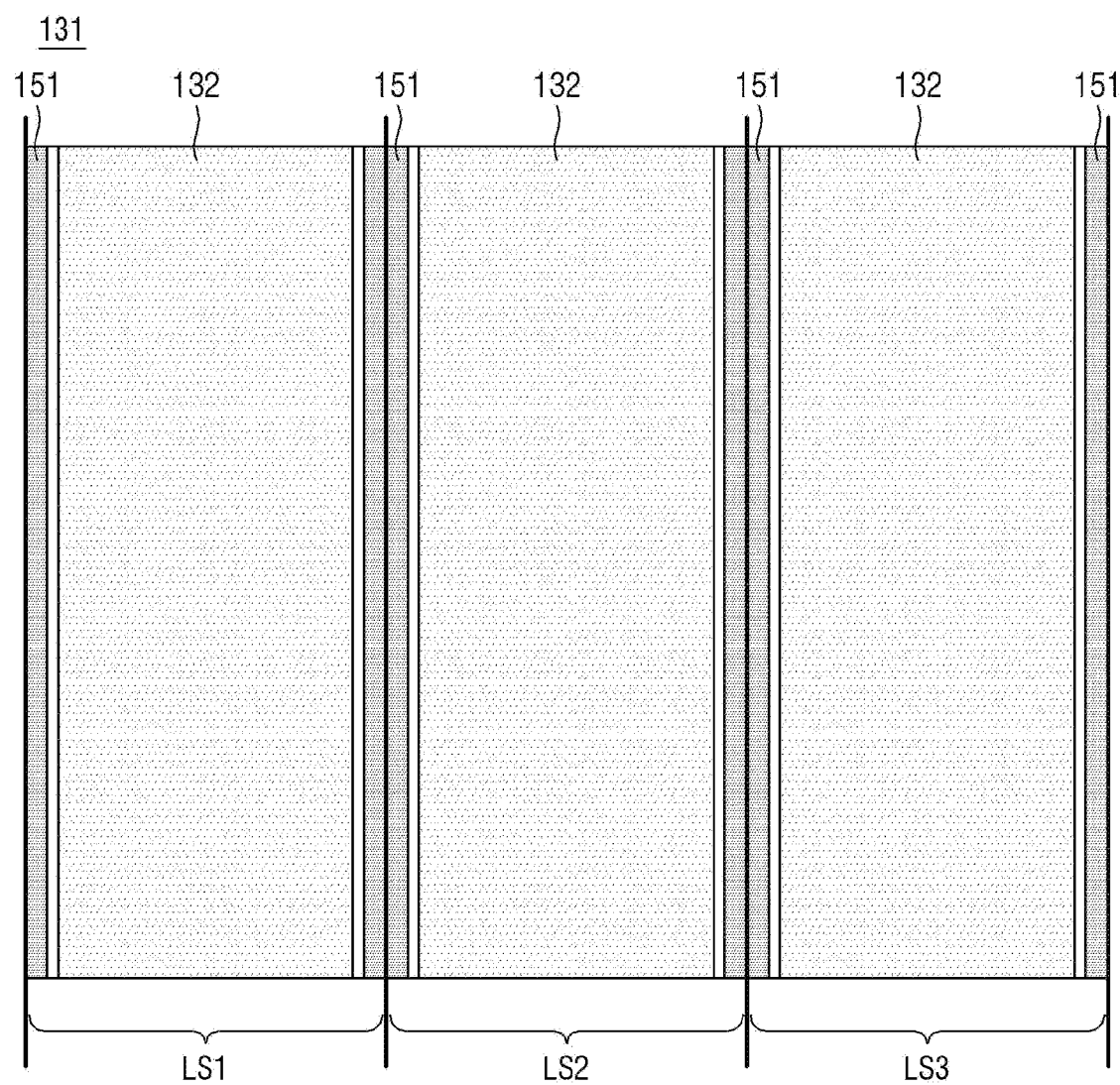
FIG. 8 is a plan view illustrating an arrangement structure of first polarizing electrodes and first light transmitting electrodes according to widths of lenses of the optical device.

FIG. 8 is a plan view illustrating an arrangement structure of first polarizing electrodes and first light transmitting electrodes according to widths of lenses of the optical device.

Referring to FIG. 8, the plurality of first polarizing electrodes 132 may have an area and a width that are smaller than an area and a width of a base side of each of the first anisotropic lenses LS1, LS2, and LS3 so as to correspond to arrangement positions of the first anisotropic lenses LS1, LS2, and LS3 included in the optical device 200. In addition, the first light transmitting electrodes 151 of the light transmitting separation membrane 150 are disposed at the same length as the first polarizing electrodes 132 along a length direction of the first anisotropic lenses LS1, LS2, and LS3 in the areas between the first polarizing electrodes 132 adjacent to each other in the plane direction. Accordingly, the first light transmitting electrodes 151 may overlap the base sides of the first anisotropic lenses LS1, LS2, and LS3 adjacent to and in contact with each other by a predetermined width.

Figures 9, 10:
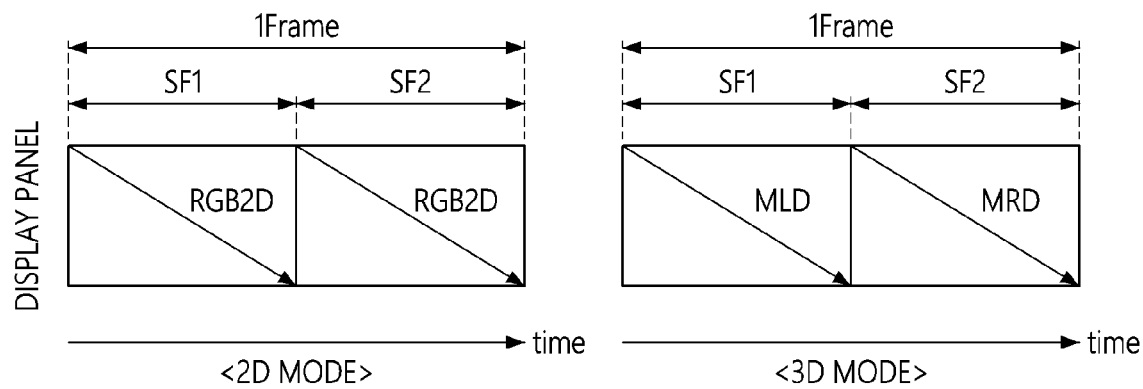
FIG. 9 is a view illustrating image display timings in a two-dimensional (2D) mode and a three-dimensional (3D) mode.
FIG. 10 is a view illustrating changes in magnitudes of voltages each applied to first and second polarizing electrodes and first and second light transmitting electrodes in the 2D mode and the 3D mode.

FIG. 9 is a view illustrating image display timings in a 2D mode and a 3D mode. In addition, FIG. 10 is a view illustrating changes in magnitudes of voltages each applied to first and second polarizing electrodes and first and second light transmitting electrodes in the 2D mode and the 3D mode.

Referring to FIG. 9, the display driver 120 may divide each first frame period 1Frame into first and second subframe periods SF1 and SF2 and supply 2D image data voltages RGB2D for displaying the 2D image to the data lines of the display panel 110 during the first subframe period SF1 and the second subframe period SF2, in the 2D mode. Accordingly, the display panel 110 may be driven at a frequency that is twice the input frame frequency. The frame frequency is 60 Hz in a national television standards committee (NTSC) system and is 50 Hz in a phase-alternating line (PAL) system. For example, the frame frequency of the display panel 110 may be driven at 120 Hz, which is twice the frame frequency of an input image in the NTSC system.

Referring to FIG. 10, the display driver 120 may supply the first driving voltage to the plurality of first polarizing electrodes 132 and supply the second driving voltage at the same voltage magnitude as the first driving voltage to the second polarizing electrodes 142 during a 2D mode driving period. In this case, the display driver 120 may generate the first and second driving voltages so that a difference between the first driving voltage of the first polarizing electrodes 132 and the second driving voltage of the second polarizing electrodes 142 is maintained at a preset reference voltage magnitude (e.g., 5 V) or less and supply the first and second driving voltages to the first polarizing electrodes 132 and the second polarizing electrodes 142, respectively.

Similarly, the display driver 120 may supply the first control voltage to the first light transmitting electrodes 151 of the light transmitting separation membranes 150 and supply the second control voltage at the same voltage magnitude as the first control voltage to the second light transmitting electrodes 155 of the light transmitting separation membranes 150 during the 2D mode driving period. In this case, the display driver 120 may generate the first and second control voltages so that a difference between the first control voltage of the first light transmitting electrodes 151 and the second control voltage of the second light transmitting electrodes 155 is maintained at a preset reference voltage magnitude (e.g., 1 V) or less and supply the first and second control voltages to the first light transmitting electrodes 151 and the second light transmitting electrodes 155, respectively.

Referring to FIG. 9, the display driver 120 may divide each first frame period 1Frame into first and second subframe periods SF1 and SF2 and supply 3D image data voltages MRD for displaying the 3D image to the data lines of the display panel 110 during the first subframe period SF1 and the second subframe period SF2, in the 3D mode of displaying the stereoscopic image such as the multi-view image.

Referring to FIG. 10, the display driver 120 may supply the first driving voltage to the plurality of first polarizing electrodes 132 and supply the second driving voltage as a voltage having a magnitude greater than that of the first driving voltage by a preset voltage difference or more to the second polarizing electrodes 142 during a 3D mode driving period. For example, the display driver 120 may generate the first and second driving voltages so that a difference between the first driving voltage of the first polarizing electrodes 132 and the second driving voltage of the second polarizing electrodes 142 is maintained at a preset voltage difference (e.g., 15 V) or more and supply the first and second driving voltages to the first polarizing electrodes 132 and the second polarizing electrodes 142, respectively.

Similarly, the display driver 120 may supply the first control voltage to the first light transmitting electrodes 151 of the light transmitting separation membranes 150 and supply the second control voltage at a greater voltage magnitude than the first control voltage to the second light transmitting electrodes 155 of the light transmitting separation membranes 150 in the 3D mode. In this case, the display driver 120 may generate the first and second control voltages so that a difference between the first control voltage of the first light transmitting electrodes 151 and the second control voltage of the second light transmitting electrodes 155 is maintained at a preset reference voltage difference (e.g., 5 V) or more and supply the first and second control voltages to the first light transmitting electrodes 151 and the second light transmitting electrodes 155, respectively.

Figure 11:
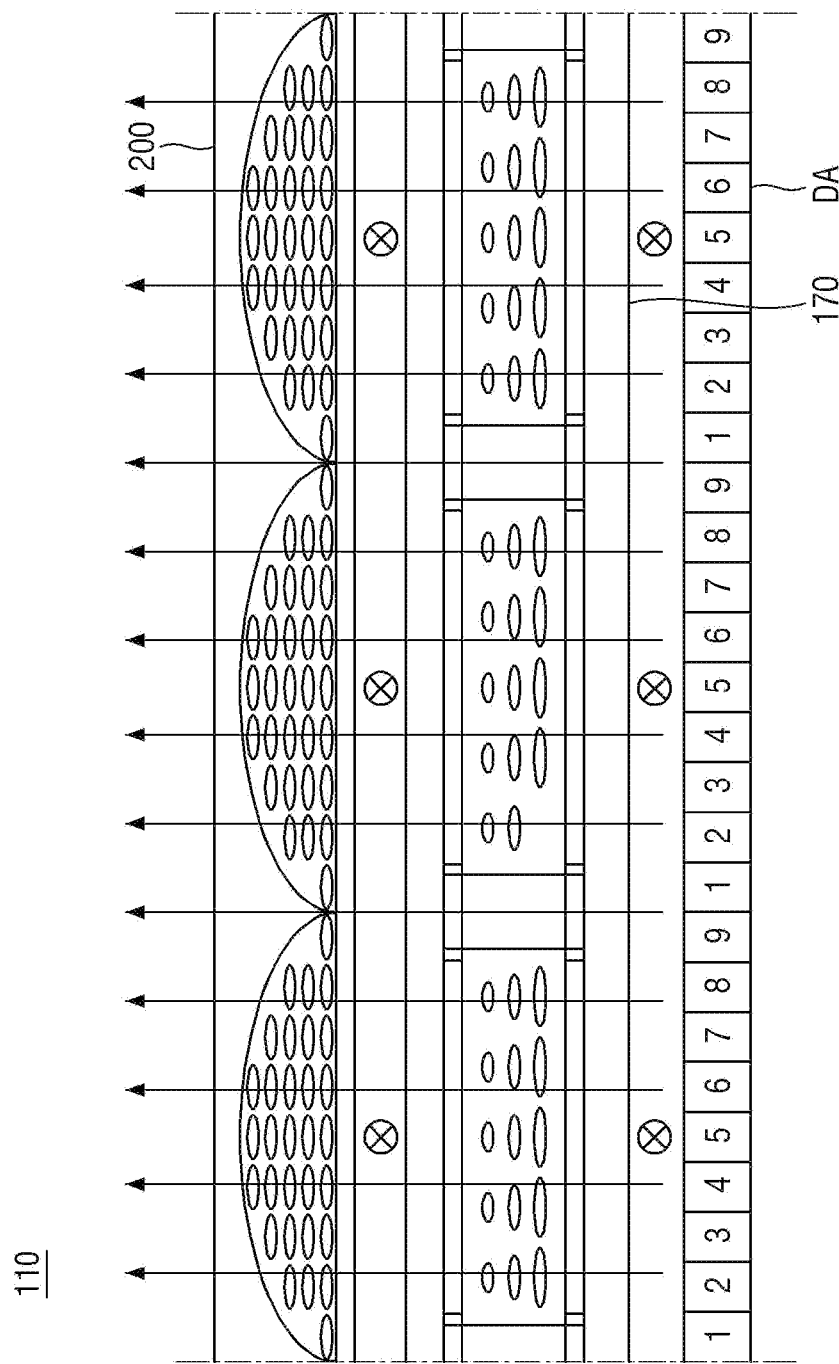
FIG. 11 is a cross-sectional view illustrating light emission paths of a light transmission control unit and the optical device in the 2D mode.

FIG. 11 is a cross-sectional view illustrating light emission paths of a light transmission control unit and the optical device in the 2D mode.

Referring to FIG. 11, the display driver 120 supplies the 2D image data voltages RGB2D for displaying the 2D image to the data lines of the display panel 110 during each first frame period 1Frame or each of the first and second subframe periods SF1 and SF2 in the 2D mode.

All of the first to third sub-pixels SP1, SP2, and SP3 disposed in the display area DA of the display panel 110 may emit the 2D image display light in the first linearly polarized light ⓧ "(X)" direction to the front surface according to an arrangement alignment or the like of polarizers on the front surface.

The display driver 120 generates the first and second driving voltages so that the difference between the first driving voltage and the second driving voltage is maintained at a preset reference voltage magnitude or less and supplies the first and second driving voltages to the first polarizing electrodes 132 and the second polarizing electrodes 142 of the light transmission control unit 170, respectively. Since a voltage difference between the first polarizing electrodes 132 and the second polarizing electrodes 142 is maintained at a preset reference voltage difference or less, the plurality of polarization control layers 135 each interposed between the respective first polarizing electrodes 132 and second polarizing electrodes 142 may maintain the refractive index in the minor axis directions of the liquid crystals.

When the 2D image display light is incident in the first linearly polarized light ⊗ "(X)" direction from the display area DA of the display panel 110, the 2D image display light incident in the first linearly polarized light ⊗ "(X)" direction passes as it is in the first linearly polarized light ⊗ "(X)" direction according to the refractive index in the minor axis directions of the liquid crystals included in the polarization control layers 135.

In addition, since the image display light is incident in the first linearly polarized light ⊗ "(X)" direction on the first anisotropic lenses LS of the optical device 200, the 2D image display light incident in the first linearly polarized light ⊗ "(X)" direction passes as it is in the first linearly polarized light direction according to the refractive index in the minor axis directions of the liquid crystals included in the first anisotropic lenses LS. In this case, since the plurality of second anisotropic lenses CLS also have the refractive index in the minor axis directions of the liquid crystals, the 2D image display light in the first linearly polarized light ⊗ "(X)" direction is not refracted and passes in the front surface direction at the interfaces between the plurality of first anisotropic lenses LS and the plurality of second anisotropic lenses CLS.

The display driver 120 generates the first and second control voltages so that the difference between the first control voltage and the second control voltage is maintained at a preset reference voltage magnitude (e.g., 5 V) or less and supplies the first and second control voltages to the first polarizing electrodes 132 and the second polarizing electrodes 142 included in the plurality of light transmitting separation membranes 150, respectively, during the 2D mode driving period.

Since the voltage difference between the first control voltage of the first light transmitting electrode 151 and the second control voltage of the second light transmitting electrode 155 is the preset reference voltage magnitude or less, the electrochromic materials included in the color-change material layer 153 are oxidized to be kept transparent. Accordingly, the plurality of light transmitting separation membranes 150 pass the 2D image display light incident from the display area DA to the front surface.

Figure 12:
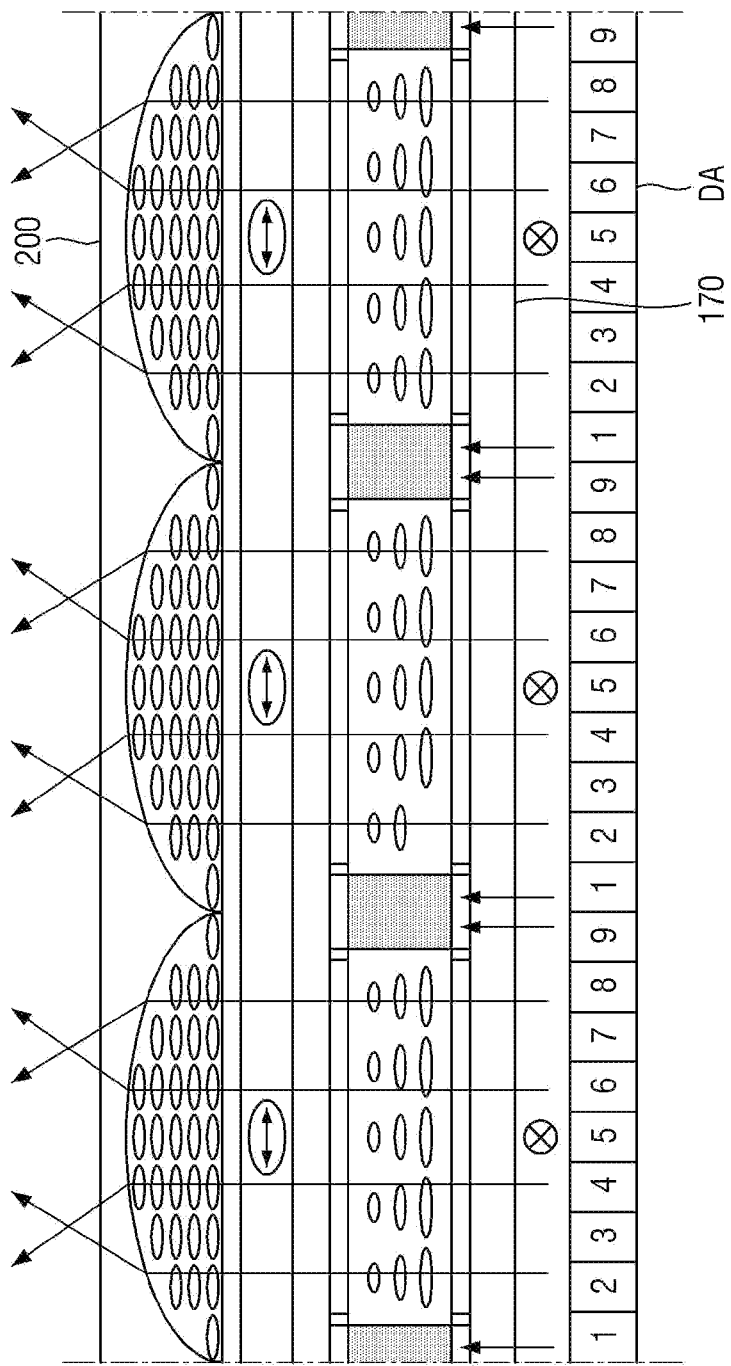
FIG. 12 is a cross-sectional view illustrating light emission paths of the light transmission control unit and the optical device in the 3D mode.

FIG. 12 is a cross-sectional view illustrating light emission paths of the light transmission control unit and the optical device in the 3D mode. In addition, FIG. 13 is a cross-sectional view illustrating the light emission paths of the light transmission control unit and the optical device illustrated in FIG. 12 in more detail.

Figure 13:
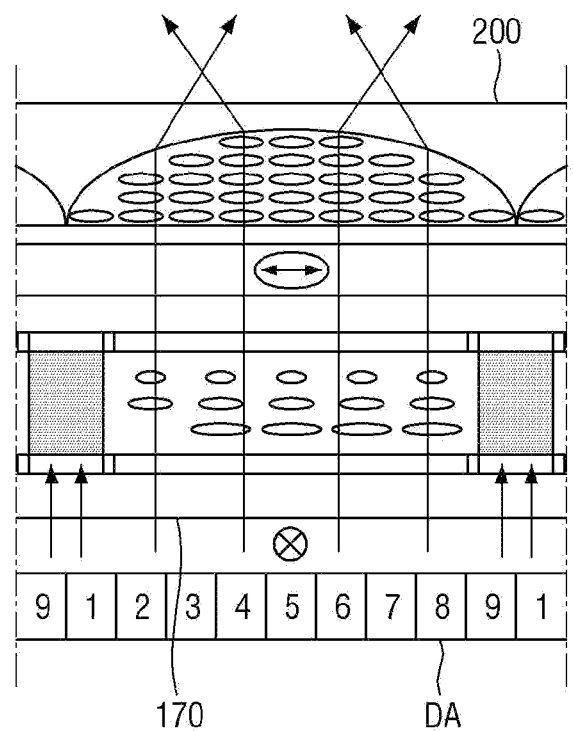
FIG. 13 is a cross-sectional view illustrating the light emission paths of the light transmission control unit and the optical device illustrated in FIG. 12 in more detail.

Referring to FIGS. 12 and 13, the display driver 120 supplies the 3D image data voltages MRD for displaying the 3D image to the data lines of the display panel 110 during each first frame period 1Frame or each of the first and second subframe periods SF1 and SF2 in the 3D mode.

All of the first to third sub-pixels SP1, SP2, and SP3 disposed in the display area DA of the display panel 110 may emit the 3D image display light in the first linearly polarized light ⊗ "(X)" direction to the front surface according to an arrangement alignment or the like of polarizers on the front surface.

The display driver 120 generates the first and second driving voltages so that the difference between the first driving voltage and the second driving voltage is maintained at a voltage magnitude greater than a preset reference voltage magnitude and supplies the first and second driving voltages to the first polarizing electrodes 132 and the second polarizing electrodes 142 of the light transmission control unit 170, respectively. Since the voltage difference between the first polarizing electrodes 132 and the second polarizing electrodes 142 is maintained at the preset reference voltage difference or more, the plurality of polarization control layers 135 each interposed between the respective first polarizing electrodes 132 and second polarizing electrodes 142 may be converted to have the refractive index in the major axis directions of the liquid crystals.

When the 3D image display light is incident in the first linearly polarized light ⊗ "(X)" direction from the display area DA of the display panel 110, the polarized light direction of the 3D image display light incident in the first linearly polarized light ⊗ "(X)" direction is changed into the second linearly polarized light ↔"←→" direction according to the refractive index in the major axis directions of the liquid crystals included in the polarization control layers 135, and the 3D image display light is emitted in the second linearly polarized light ↔"←→" direction.

In this case, since the image display light is incident in the second linearly polarized light ↔"←→" direction on the first anisotropic lenses LS of the optical device 200, the 3D image display light incident in second linearly polarized light ↔"←→" direction passes in the second linearly polarized light ↔"←→" direction according to the refractive index in the major axis directions of the liquid crystals included in the first anisotropic lenses LS. In this case, since the plurality of second anisotropic lenses CLS also have the refractive index in the minor axis directions of the liquid crystals, the 3D image display light in the second linearly polarized light ↔"←→" direction is refracted at the interfaces between the plurality of first anisotropic lenses LS and the plurality of second anisotropic lenses CLS. The 3D image display light is emitted in a direction in which it is refracted.

The display driver 120 generates the first and second control voltages so that the difference between the first control voltage and the second control voltage varies to the preset reference voltage magnitude (e.g., 5 V) or more and supplies the first and second control voltages to the first polarizing electrodes 132 and the second polarizing electrodes 142 included in the plurality of light transmitting separation membranes 150, respectively, during the 3D mode driving period.

Since the voltage difference between the first control voltage of the first light transmitting electrode 151 and the second control voltage of the second light transmitting electrode 155 becomes greater than the preset reference voltage magnitude, the electrochromic materials included in the color-change material layer 153 are reduced to be color-changed to a black color. Accordingly, the plurality of light transmitting separation membranes 150 block the 3D image display light incident from the display area DA on the rear surface. In addition, the plurality of light transmitting separation membranes 150 allow the 3D image display light traveling in the second linearly polarized ↔"←→" direction to be divided and emitted for each emission area. Accordingly, the plurality of light transmitting separation membranes 150 may allow the 3D image display light of the sub-pixels adjacent to each other or the emission areas adjacent to each other to be emitted without overlapping each other.

Figure 14:
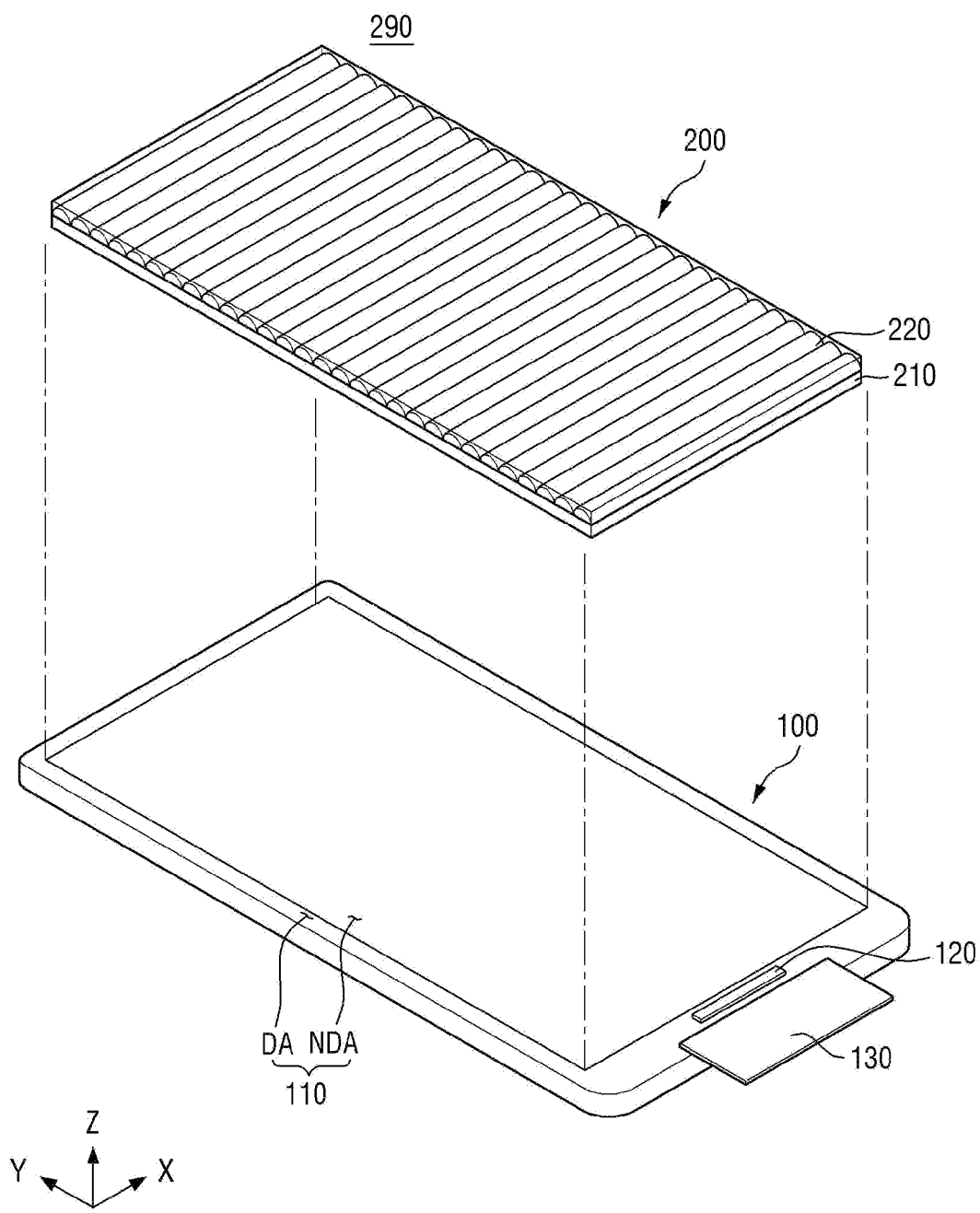
FIG. 14 is an exploded perspective view illustrating a display device according to another embodiment of the present disclosure.

FIG. 14 is an exploded perspective view illustrating a display device according to another embodiment of the present disclosure. In addition, FIG. 15 is a plan view illustrating configurations of a display panel and an optical device illustrated in FIG. 14.

Figure 15:
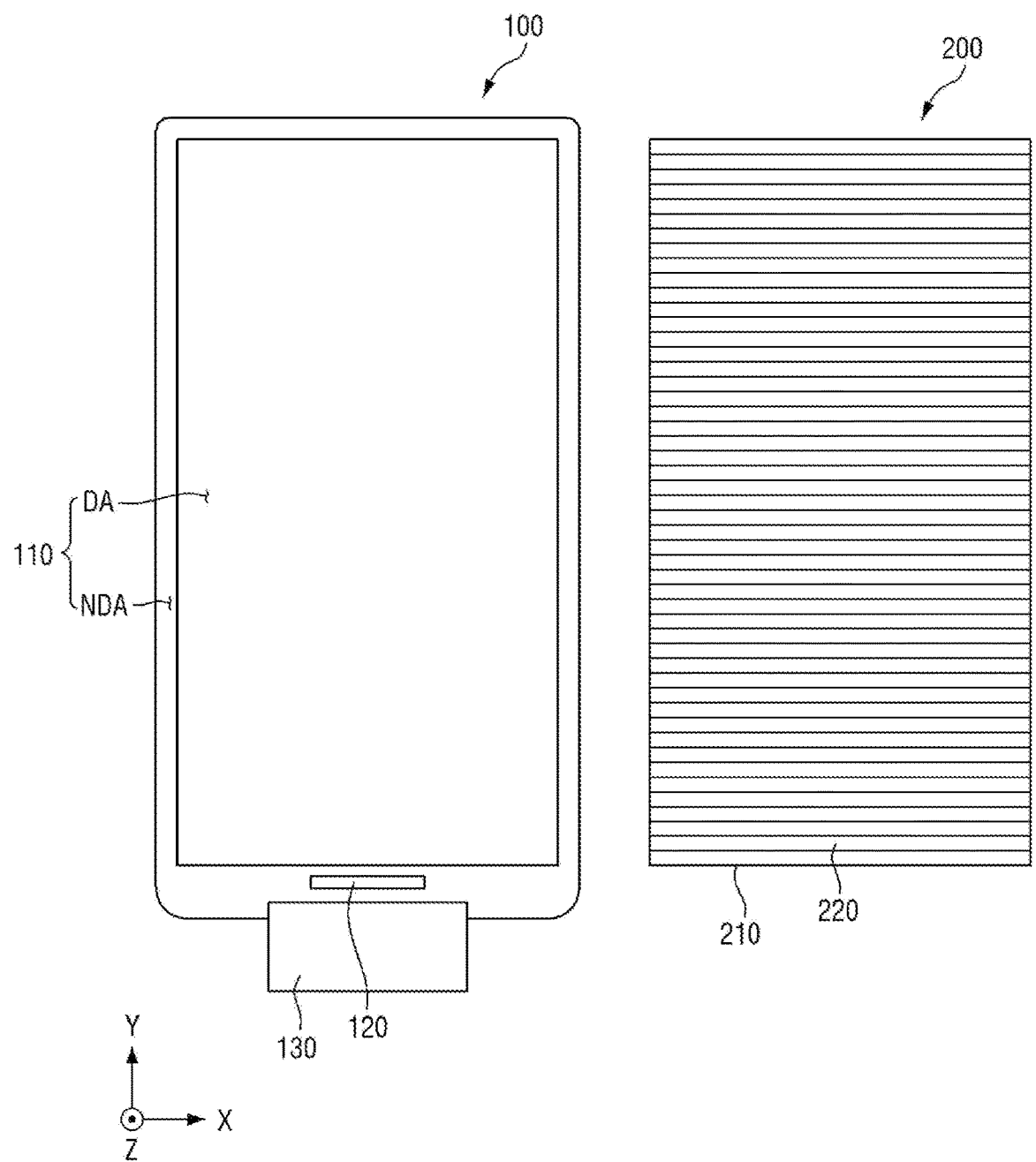
FIG. 15 is a plan view illustrating configurations of a display panel and an optical device illustrated in FIG. 14.

Referring to FIGS. 14 and 15, a display device 290, according to an embodiment, may be implemented as a flat panel display device such as an organic light emitting display (OLED), and may be a stereoscopic image display device including a display module 100 and an optical device 200.

The display module 100 may include a display panel 110, a display driver 120, and a circuit board 130.

The display panel 110 may include a display area DA and a non-display area NDA. The display area DA may include data lines, scan lines, voltage supply lines, and a plurality of pixels connected to the corresponding data lines and scan lines.

The optical device 200 may be disposed on the display module 100. The optical device 200 may be attached to one surface of the display module 100 through an adhesive. The optical device 200 may be bonded to the display module 100 by a panel bonding device. For example, the optical device 200 may be implemented as a lenticular lens sheet including first anisotropic lenses LS1, LS2, and LS3.

In concluding the detailed description, those skilled in the art will appreciate that many variations and modifications can be made to the preferred embodiments without substantially departing from the principles of the present disclosure.

What is claimed is:

1. A display device, comprising:
    a display panel configured to display a two-dimensional (2D) image and a three-dimensional (3D) image;
    a light transmission control unit passing 2D image display light displayed on the display panel in a first linearly polarized light direction, converting a polarized light direction of 3D image display light displayed on the display panel into a second linearly polarized light direction, and emitting the 3D image display light in the second linearly polarized light direction; and
    an optical device passing the 2D image display light incident in the first linearly polarized light direction through the light transmission control unit while maintaining optical paths of the 2D image display light and refracting and emitting the 3D image display light of which the polarized light direction is converted into the second linearly polarized light direction through light transmission control unit.

2. The display device of claim 1, further comprising a display driver changing a voltage difference between first and second driving voltages and supplying the first and second driving voltages to the light transmission control unit during each 2D image display period or 3D image display period so that the light transmission control unit passes the 2D image display light in the first linearly polarized light direction and converts the polarized light direction of the 3D image display light into the second linearly polarized light direction and emits the 3D image display light in the second linearly polarized light direction.

3. The display device of claim 1, wherein the light transmission control unit includes a plurality of light transmitting separation membranes partitioning a light emission area of the light transmission control unit according to arrangement positions of anisotropic lenses included in the optical device, and divides and emits the 3D image display light for each emission area using the plurality of light transmitting separation membranes.

4. The display device of claim 1, wherein the light transmission control unit includes:
    a first base substrate disposed on a front surface of the display panel;
    a plurality of first polarizing electrodes disposed on the first base substrate according to an arrangement position of each anisotropic lens included in the optical device;
    a second base substrate facing the first base substrate and parallel to the first base substrate;
    a plurality of second polarizing electrodes disposed in a rear surface direction of the second base substrate so as to face the plurality of first polarizing electrodes and correspond to the plurality of first polarizing electrodes in parallel with the plurality of first polarizing electrodes;
    a plurality of polarization control layers interposed between the plurality of first polarizing electrodes and the plurality of second polarizing electrodes, respectively; and
    a plurality of light transmitting separation membranes interposed between the first base substrate and the second base substrate so that a light emission area of the light transmission control unit is partitioned according to the arrangement position of each anisotropic lens.

5. The display device of claim 4, wherein the plurality of first polarizing electrodes are disposed on the first base substrate in parallel with at least one anisotropic lens so as to correspond to the arrangement position of each anisotropic lens and a shape of a base side of each anisotropic lens, and
    wherein each of the plurality of first polarizing electrodes has an area and a width that are smaller than an area and a width of the base side of each of the anisotropic lenses, respectively.

6. The display device of claim 5, wherein the plurality of second polarizing electrodes are disposed on a rear surface of the second base substrate so as to face the plurality of first polarizing electrodes with each of the polarization control layers interposed therebetween and correspond to the plurality of first polarizing electrodes in parallel with the plurality of first polarizing electrodes, and
    wherein the plurality of second polarizing electrodes have a same area, width, and length as the first polarizing electrodes facing the plurality of second polarizing electrodes, respectively.

7. The display device of claim 5, wherein the plurality of polarization control layers pass the 2D image display light incident in the first linearly polarized light direction in the first linearly polarized light direction and convert the polarized light direction of the 3D image display light incident in the first linearly polarized light direction into the second linearly polarized light direction and emit the 3D image display light in the second linearly polarized light direction, according to a voltage difference between the first polarizing electrodes and the second polarizing electrodes.

8. The display device of claim 7, wherein a display driver is disposed on the display panel, the display driver changing a voltage difference between first and second driving voltages and supplying the first and second driving voltages to the first and second polarizing electrodes, respectively, in a 2D image display mode or a 3D image display mode so that the plurality of polarization control layers pass the 2D image display light in the first linearly polarized light direction and convert the polarized light direction of the 3D image display light into the second linearly polarized light direction and emit the 3D image display light in the second linearly polarized light direction.

9. The display device of claim 4, wherein the plurality of light transmitting separation membranes pass the 2D image display light incident in the first linearly polarized direction during a 2D image display period and control optical paths of the 3D image display light so that the 3D image display light incident in the second linearly polarized direction is divided and emitted for each emission area during a 3D image display period, in response to first and second control signals of a display driver.

10. The display device of claim 9, wherein the plurality of light transmitting separation membranes are disposed in areas between the first polarizing electrodes adjacent to each other in a plane direction among the plurality of the first polarizing electrodes and areas between the second polarizing electrodes adjacent to each other in the plane direction among the plurality of second polarizing electrodes, respectively, are disposed at a same length as the anisotropic lenses included in the optical device, and overlap base sides of two anisotropic lenses adjacent to each other by a preset width.

11. The display device of claim 9, wherein the plurality of light transmitting separation membranes include:
   first light transmitting electrodes each disposed in areas between the first polarizing electrodes adjacent to each other among the plurality of the first polarizing electrodes;
   second light transmitting electrodes each disposed in areas between the second polarizing electrodes adjacent to each other among the plurality of second polarizing electrodes; and
   color-changing material layers each interposed between the first light transmitting electrodes and the second light transmitting electrodes.

12. The display device of claim 11, wherein the first light transmitting electrodes are formed on the first base substrate so as to have the same length as the first polarizing electrodes along a length direction of the first polarizing electrodes, and
   wherein the second light transmitting electrodes are formed between the second polarizing electrodes adjacent to each other so as to face the first light transmitting electrodes with each of the color-changing material layers interposed therebetween and correspond to the first light transmitting electrodes in parallel with the first light transmitting electrodes, and have a same area, width, and length as the first light transmitting electrodes.

13. The display device of claim 12, wherein the color-changing material layer is kept transparent or is color-changed to a black color according to a voltage difference between a first control voltage of the first light transmitting electrode and a second control voltage of the second light transmitting electrode.

14. The display device of claim 13, wherein a display driver is disposed on the display panel, the display driver generating the first and second control voltages having the same voltage magnitude and supplying the first and second control voltages to the first and second light transmitting electrodes, respectively, during the 2D image display period and generating the first and second control voltages having a voltage difference greater than a preset voltage difference and supplying the first and second control voltages to the first and second light transmitting electrodes, respectively, during the 3D image display period.

15. The display device of claim 4, wherein the optical device includes:
   a flat part disposed as a plane in a front surface direction of the light transmission control unit; and
   a stereoscopic lens layer emitting the 2D image display light incident in the first linearly polarized light direction in the front surface direction while maintaining optical paths of the 2D image display light and refracting and changing light paths of the 3D image display light incident in the second linearly polarized light direction and emitting the 3D image display light in a direction in which the light paths of the 3D image display light are refracted.

16. The display device of claim 15, wherein the stereoscopic lens layer includes:
   a plurality of first anisotropic lenses arranged side by side on a front surface of the flat part; and
   a plurality of second anisotropic lenses covering the plurality of first anisotropic lenses and formed on front surfaces of the plurality of first anisotropic lenses.

17. The display device of claim 16, wherein each of the plurality of first anisotropic lenses are formed in a hemispherical shape in which liquid crystals are hardened in a state in which major axis directions of the liquid crystals are aligned in the second linearly polarized light direction, such that the plurality of first anisotropic lenses have characteristics of refractive index anisotropy that a refractive index of emitted light changes depending on light in the first or second linearly polarized light direction incident from a rear surface direction.

18. The display device of claim 17, wherein the plurality of second anisotropic lenses have a same refractive index as a refractive index in minor axis directions of the liquid crystals, and correspond to the plurality of first anisotropic lenses in a one-to-one manner by covering the plurality of first anisotropic lenses, respectively, or are integrally formed to cover all of the plurality of first anisotropic lenses.

19. A display device, comprising:
   a display panel displaying a 2D image and a 3D image;
   a light transmission control unit passing 2D image display light displayed on the display panel in a first linearly polarized light direction and converting a polarized light direction of 3D image display light displayed on the display panel into a second linearly polarized light direction and emitting the 3D image display light in the second linearly polarized light direction;
   an optical device passing image display light emitted in the first linearly polarized light direction through the light transmission control unit while maintaining optical paths of the image display light and refracting optical paths of image display light emitted in the second linearly polarized light direction through light transmission control unit and emitting the image display light of which the optical paths are refracted; and
   a display driver controlling an emission operation of the first or second linearly polarized light direction of the light transmission control unit according to a 2D image display mode or a 3D image display mode.

* * * * *